3,010,966
DERIVATIVES OF VITAMIN B₆
Otto Zima and Gustav Schorre, Darmstadt-Eberstadt, Germany, assignors to E. Merck Aktiengesellschaft, Darmstadt, Germany, a corporation of Germany
No Drawing. Filed Mar. 19, 1959, Ser. No. 800,399
Claims priority, application Germany Mar. 21, 1958
19 Claims. (Cl. 260—294.8)

The invention relates to the heretofore unknown 3-mercaptomethyl - 4 - hydroxymethyl-5-hydroxy-6-methyl-pyridine and a method of preparing the same. This compound is particularly suitable for the treatment of injuries to the human or animal organism by ionizing rays.

It has been found that the new compound can be produced by reacting a salt of the 3,4-bis-bromomethyl-5-hydroxy-6-methyl-pyridine of the Formula I (see subsequent reaction sequence) with an alkali metal xanthogenate, converting the obtained 4-hydroxymethyl-5-hydroxy-6-methyl-pyridyl-(3)-methyl-xanthogenate (Compound II) by treatment with a weak base into bis-[4-hydroxymethyl - 5 - hydroxy - 6 - methyl - pyridyl - (3)-methyl]-disulfide (Compound III) and then splitting this disulfide, by treatment with reducing agents in a well known manner, into the corresponding mercaptan.

A particularly suitable starting material is the 3,4-bis-bromomethyl - 5 - hydroxy-6-methyl-pyridinium-bromide (Compound I, wherein X designates bromine). In order to introduce the xanthogenic acid residue, potassium or sodium xanthogenate is preferably used. To produce the disulfide (Compound III) from the xanthogenic acid ester (Compound II), alcoholic ammonia solution has been found to be particularly suitable. The reduction of the disulfide (Compound III) to 3-mercaptomethyl-4-hydroxymethyl-5-hydroxy-6-methyl-pyridine is obtained with a good yield, for instance, by treatment with elemental tin in hydrochloric acid solution or by electrolytic reduction.

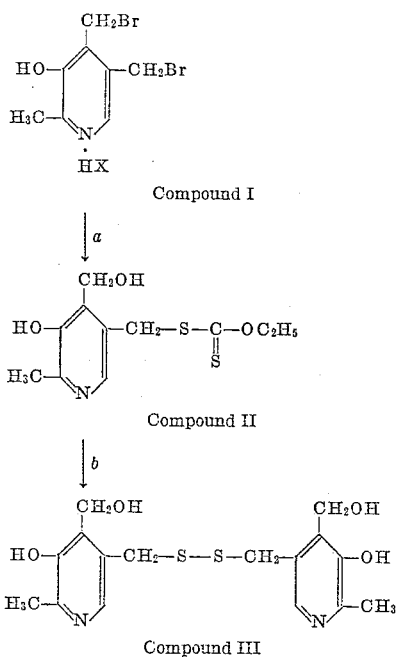

wherein X designates halogen, preferably bromine or chlorine.

The invention accordingly offers the possibility of producing, by smooth reactions resulting in good yields, a substance suitable for use as a chemotherapeutic agent for the treatment of injuries to the human or animal organism caused by ionizing rays. The 3 - mercaptomethyl - 4-hydroxymethyl-5-hydroxy-6-methyl-pyridine is also particularly suitable as a prophylactic to physical injuries by ionizing rays.

The following are examples in accordance with this invention.

EXAMPLE 1

Reaction a.—Preparation of Compound II

To a solution of 60 g. (grams) of potassium-xanthogenate in 240 cc. of water there is added dropwise, while being cooled with ice, a solution of 42 g. of 3,4-bis-bromomethyl-4-hydroxy-5-methyl-pyridinium-bromide in 1 liter of water so that the temperature remains between 2–5° C. After stirring for 1 hour at the same temperature, the water is decanted off and the residue is triturated with acetone. Yield: 25 g. of 4-hydroxymethyl-5-hydroxy-6-methyl-pyridyl-(3)-methylxanthogenate; melting point: 170–171° C. (alcohol, decomposition).

EXAMPLE 2

Reaction b.—Preparation of Compound III 40 g. of 4-hydroxymethyl-5-hydroxy-6-methyl-pyridyl-(3)-methylxanthogenate are left standing at room temperature for 5 days in a mixture of 800 cc. of alcohol and 400 cc. of aqueous NH₃-solution, and subsequently concentrated under vacuum to about 50 cc. The precipitated bis-[4 - hydroxymethyl-5-hydroxy-6-methyl-pyridyl (3)]-disulfide is sucked off. Yield: 20 g. of the disulfide; melting point: 218–220° C. (butanol, decomposition).

Dihydrochloride, melting point: 184° C. (absolute alcohol).

Dihydrobromide, melting point: 198–199° C. (methanol).

EXAMPLE 3

Reaction c.—Preparation of Compound IV 14.5 g. of bis-[4-hydroxymethyl-5-hydroxy-6-methyl-pyridyl-(3)-methyl]-disulfide are dissolved in 100 cc. of 2 N HCl heated to boiling temperature, and 6 g. of tin dust are added portion-wise. After boiling for 1 hour, the undissolved tin is filtered off; the filtrate is diluted with water; and saturated with H₂S. The stannic sulfide is sucked off. The filtrate is evaporated under vacuum until dry; and the residue is recrystallized from isopropanol. The 3 - mercaptomethyl - 4 - hydroxymethyl - 5 - hydroxy-6-methyl-pyridinium-chloride melts at 119–120° C. The product can be further purified by chromatography on silica gel whereby a melting point of 132–133° is obtained (isopropanol).

EXAMPLE 4

80 g. of bis - [4 - hydroxymethyl-5-hydroxy-6-methyl-pyridyl - (3) - methyl-disulfide-dihydrochloride-hydrate (prepared by recrystallizing the dihydrochloride having a melting point of 184° C. from 90% aqueous ethanol obtained according to Example 2, Reaction b, are electrochemically reduced as follows:

A short glass pipe is used as the cell vessel. The pipe is dipped into a bath of water for the purpose of exactly maintaining the temperature of the reaction solution. A clay diaphragm is fitted into the glass pipe and is used as the anode space. A graphite rod is used as the anode. The anode liquid consists of hydrochloric acid which is prepared by diluting one part of concentrated hydrochloric acid with two parts of water.

A silver sheet which envelopes the the diaphragm at a distance of about 8 cm. is used as the cathode. The disulfide hydrate is dissolved in hydrochloric acid of the same concentration as mentioned at elevated temperature and the cathode space is filled with the solution. About 560 cc. of cathode liquid is used. The applied electric data are as follows:

| | |
|---|---|
| Current in amps | 2.73 |
| Current density in amps./dm.$^2$ | 0.95 |
| Cell potential in volts | 1.77 |
| Current consumption in kwh./kg. pure substance | 0.366 |
| Grams of pure substance per applied amp./hour | 4.84 |

The reaction time is about 5 hours. The reaction temperature is at about 66° C.

The reaction solution is concentrated by evaporation under vacuum and the residue is recrystallized from isopropanol. Yield: 66 g.=85.5% (with respect to the used disulfide hydrate); melting point: 132–135° C.

EXAMPLE 5

10 g. of 3-mercaptomethyl-4-hydroxymethyl-5-hydroxy-6-methyl-pyridinium chloride are dissolved in 30 ml. of water. The solution is neutralized by addition of a saturated sodium bicarbonate solution. The precipitate formed is sucked off and washed with water. Upon recrystallization from dioxan, 7.5 g. of 3-mercaptomethyl-4 - hydroxymethyl - 5 - hydroxy-6-methyl-pyridine with a melting point of 181° C. are obtained.

The free base so obtained can be converted to several pharmaceutically acceptable salts, e.g. to the amido-sulfonate: To a solution of 5 g. of 3-mercaptomethyl-4-hydroxymethyl-5-hydroxy-6-methyl-pyridine in ethanol there is added a solution of amidosulfonic acid in ethanol in a slight excess. The precipitated salt shows upon recrystallization from absolute ethanol a melting point of 148°.

The starting material (Compound I) can be prepared according to the method described in Journal American Chemical Society, vol. 61, 1247 (1939):

780 g. of methoxy adermine are dissolved in 4 kg. of aqueous HBr (66%) and heated to 100–105° for 20 minutes. After cooling the precipitate is sucked off and washed with acetone. The yield is 1.23 kg.; the 3,4-bis-bromomethyl-5-hydroxy-6-methyl-pyridinium-bromide has a melting point of 222–223° C. (decomposition).

The corresponding chloro-derivative (3,4-bis-chloromethyl-5-hydroxy-6-methyl-pyridinium-chloride) can be prepared according to the process described in Journal American Chemical Society, vol. 61, 3307 (1939).

The conversion of the intermediate xanthogenate (Compound II) into the disulfide (Compound III) may be effectuated by using, in lieu of the ammonia described, other weakly basic substances, as for example, amines such as triethylamine and diethylamine.

The formation of the disulfide from the xanthogenate can be carried out in the presence of suitable solvents, such as lower aliphatic alcohols or water.

While the hydrochloride and the hydrobromide of the 3 - mercaptomethyl - 4 - hydroxymethyl - 5 - hydroxy - 6-methyl-pyridine have been mentioned as being currently preferred salts, the acid addition salts formed from pharmaceutically acceptable acids such as sulfuric, maleic, phosphoric, amidosulfonic, citric acid etc., are also suitable.

The 3-mercaptomethyl-4-hydroxymethyl-5-hydroxy-6-methyl-pyridine may be used, preferably in the form of a pyridinium salt of a pharmaceutically acceptable acid, for the purposes above mentioned. The substance may be administered orally or by intramuscular or intravenous injection. The preferred doses are about 250 mg. administered 2 or 3 times per day.

It will be understood that the foregoing description of the invention and the examples set forth are merely illustrative of the principles thereof. Accordingly, the appended claims are to be construed as defining the invention within the full spirit and scope thereof.

We claim:

1. A member of the group consisting of 3-mercaptomethyl-4-hydroxymethyl-5-hydroxy-6-methyl-pyridine and the pharmaceutically acceptable acid addition salts thereof.

2. 3 - mercaptomethyl - 4 - hydroxymethyl - 5 - hydroxy-6-methyl-pyridine.

3. Pharmaceutically acceptable acid addition salts of the free base in accordance with claim 2.

4. 3 - mercaptomethyl - 4 - hydroxymethyl - 5 -hydroxy-6-methyl-pyridinium-chloride.

5. A 4-hydroxymethyl-5-hydroxy-6-methyl-pyridyl-(3)-methyl-xanthogenate.

6. Bis - [4 - hydroxymethyl - 5 - hydroxy - 6 - methyl-pyridyl-(3)-methyl]-disulfide.

7. Process of preparing a sulfur-containing derivative of vitamin $B_6$ characterized in that: a salt of 3,4-bis-bromomethyl-5-hydroxy-6-methyl-pyridine is reacted with an alkali metal xanthogenate, thereby forming 4-hydroxymethyl - 5 - hydroxy - 6 - methyl - pyridyl - (3) - methyl-xanthogenate, converting said xanthogenate into bis-[4-hydroxymethyl - 5 - hydroxy - 6 - methyl - pyridyl - (3)-methyl]-disulfide, and reducing said disulfide to 3-mercaptomethyl - 4 - hydroxymethyl - 5 - hydroxy - 6 - methyl-pyridine with a suitable reducing agent.

8. Process in accordance with claim 7 characterized in that: the starting material is 3,4-bis-bromomethyl-5-hydroxy-6-methyl-pyridinium-bromide.

9. Process in accordance with claim 7 characterized in that the alkali metal xanthogenate is potassium xanthogenate.

10. Process in accordance with claim 7 characterized in that the conversion of the 4-hydroxymethyl-5-hydroxy-6-methyl-pyridyl-(3)-methylxanthogenate into the bis-[4-hydroxymethyl - 5 - hydroxy-6-methyl-pyridyl-(3)-methyl]-disulfide is effectuated by the action of ammonia.

11. Process in accordance with claim 7 characterized in that the reduction of the disulfide is effectuated by nascent hydrogen.

12. Process in accordance with claim 11 in which the nascent hydrogen is produced by the interaction of tin and hydrochloric acid.

13. Process in accordance with claim 11 in which the nascent hydrogen is produced by electrolysis.

14. In the synthesis of a compound in accordance with claim 1, the step comprising converting a salt of 3,4-bis-bromomethyl-5-hydroxy-6-methyl-pyridine into a 4-hydroxymethyl - 5 - hydroxy-6-methyl-pyridiyl-(3)-methyl-xanthogenate.

15. The step in accordance with claim 14 followed by the step of converting the formed xanthogenate into bis-[4-hydroxymethyl - 5 - hydroxy - 6 - methyl-pyridyl-(3)-methyl]-disulfide.

16. The steps in accordance with claim 15 followed by the step of converting the formed disulfide into a compound in accordance with claim 1.

17. The method which comprises reacting a salt of 3,4- bis-halomethyl-5-hydroxy-6-methyl-pyridine with an alkali metal xanthogenate, thereby to form 4-hydroxymethyl-5-hydroxy-6-methyl-pyridyl-(3)-methyl - xanthogenate.

18. The method which comprises reacting 4-hydroxymethyl - 5 - hydroxy-6-methyl-pyridyl-(3)-methyl-xanthogenate with a weak base, thereby to form bis-[4-hydroxymethyl-5-hydroxy - 6 - methyl-pyridyl-(3)-methyl]-disulfide.

19. The method which comprises reacting bis-[4-hydroxymethyl-5-hydroxy - 6 - methyl-pyridyl-(3)-methyl]-disulfide with a reducing agent, thereby to form 3-mercaptomethyl - 4 - hydroxymethyl - 5 - hydroxy-6-methyl-pyridine.

References Cited in the file of this patent

UNITED STATES PATENTS 2,483,137    Harris _____ Sept. 27, 1949

OTHER REFERENCES

Vejdelek et al.: Chem. Abstracts, vol. 47, column 8068 (1953).

Koch: Acta Chemica Scandinavica, vol. 12, pages 1873–1874 (1958).